United States Patent
Costa

(10) Patent No.: US 9,525,450 B2
(45) Date of Patent: Dec. 20, 2016

(54) TRANSCEIVER ARRANGEMENT

(71) Applicant: Huawei Technologies Co., Ltd., Shenzhen (CN)

(72) Inventor: Mario Costa, Segrate (IT)

(73) Assignee: Huawei Technologies Co., Ltd., Shenzhen (CN)

(*) Notice: Subject to any disclaimer, the term of this patent is extended or adjusted under 35 U.S.C. 154(b) by 70 days.

(21) Appl. No.: 14/293,847

(22) Filed: Jun. 2, 2014

(65) Prior Publication Data

US 2014/0273891 A1 Sep. 18, 2014

Related U.S. Application Data

(63) Continuation of application No. PCT/EP2012/074200, filed on Dec. 3, 2012.

(30) Foreign Application Priority Data

Dec. 2, 2011 (EP) .................................... 11191731

(51) Int. Cl.
*H04B 1/40* (2015.01)
*H04B 1/18* (2006.01)
*H04B 17/00* (2015.01)

(52) U.S. Cl.
CPC ........... *H04B 1/40* (2013.01); *H04B 1/18* (2013.01); *H04B 17/00* (2013.01)

(58) Field of Classification Search
None
See application file for complete search history.

(56) References Cited

U.S. PATENT DOCUMENTS

| | | | |
|---|---|---|---|
| 8,754,811 B1* | 6/2014 | Uscinowicz | H01Q 3/267 342/375 |
| 2007/0194886 A1* | 8/2007 | Bang et al. | 340/10.1 |
| 2008/0233893 A1* | 9/2008 | Duperray | 455/77 |
| 2010/0225410 A1 | 9/2010 | Margomenos et al. | |
| 2011/0267086 A1 | 11/2011 | Pagani | |

FOREIGN PATENT DOCUMENTS

WO 2004064197 A1 7/2004

OTHER PUBLICATIONS

Yau et al, Design of 30GHz Transition, IEEE, 2007.*
Orfanidis, Electromagnetic Waves and Antennas, 2008 http://www.ece.rutgers.edu/~orfanidi/ewa/.*

* cited by examiner

Primary Examiner — Ping Hsieh
Assistant Examiner — James Yang
(74) Attorney, Agent, or Firm — Slater Matsil, LLP

(57) ABSTRACT

A transceiver arrangement has a circuit board with a transmit path and a receive path, a transceiver transmit output coupled with the transmit path, a transceiver receive input coupled with the receive path, and a loopback path. The loopback path couples the transceiver transmit output and the transceiver receive input and comprises a waveguide.

20 Claims, 4 Drawing Sheets

TRANSCEIVER ARRANGEMENT

This application is a continuation of International Application No. PCT/EP2012/074200, filed on Dec. 3, 2012, which claims priority to European Patent Application No. EP11191731.6, filed on Dec. 2, 2011, both of which are hereby incorporated by reference in their entireties.

TECHNICAL FIELD

The invention relates to the field of radio frequency transceivers.

BACKGROUND

Transceivers are widely used in the field of mobile communications, for example GSM, UMTS and Long-Term Evolution, LTE. For example, during the installation of a transceiver of a communication system, it can be desirable to perform various tests with the transceiver, preferably without the influence of an antenna-air interface. To this end, some transceivers are provided with a loopback feature which makes it possible to take an output of a transmit (TX) path of the transceiver as an input of the receive (RX) path of the transceiver. In this case, TX path and RX path are set to work with the same radio frequency.

Such a loopback feature may be implemented inside an antenna duplexer connected to Transceiver TX output and Transceiver RX input. However, a loopback in the antenna duplexer increases the complexity and the costs of the duplexer.

Another possibility for loopback is to implement a connection using directional couplers at the output of the TX path and at the input of the RX path and to form a connection by means of a strip line integrated on a printed circuit board. However, if the strip line is integrated on the same circuit board as the transceiver, the strip line crosses the circuit board from a TX side to an RX side of the transceiver. As the length of the strip line is not negligible and an insertion loss increases for increasing frequencies, the loopback driver amplifier gain may need to be increased and coupling factors of the directional couplers may have to be set accordingly. Furthermore, other signals on the circuit board may couple with the strip line of the loopback.

SUMMARY

It is the object of the invention to provide a concept for an efficient loopback for a radio frequency transceiver.

This object is achieved by the features of the independent claim. Further embodiments are apparent from the dependent claims.

The invention is based on the finding that a loopback path of a transceiver can be equipped with a waveguide, which, for example, is integrated with or arranged close to the circuit board of the transceiver itself. The waveguide may be a hollow metal conductor that provides a path to guide microwave signals. According to some implementation, an insertion loss of the waveguide is negligible also at higher frequencies, for example in the Gigahertz range, and a length of the waveguide is basically not influencing its performance. Furthermore, a waveguide may act as a high-pass filter, such that signals having a frequency lower than the cut-off frequency of the waveguide will not be coupled to the loopback path. Furthermore, the waveguide may be integrated with or arranged close to the circuit board of the transceiver, which may then reduce production cost according to some implementation.

According to an aspect, the invention relates to a transceiver arrangement, comprising a circuit board with a TX path and an RX path, a transceiver TX output coupled with the TX path, a transceiver RX input coupled with the RX path, and a loopback path coupling the transceiver TX output and the transceiver RX input. The loopback path comprises a waveguide. For example, the transceiver TX output is an antenna duplexer port for transmitting radio frequency signals and the transceiver RX input is an antenna duplexer port for receiving radio frequency signals. The TX path and the RX path may be integrated on the circuit board, for example in different areas of the circuit board. For example, the circuit board is a multi-layer printed circuit board.

According to a first implementation form, the invention relates to a transceiver arrangement, wherein the waveguide is at least partly integrated with the circuit board. Thus, the transceiver arrangement of this implementation form can be produced with little effort. Furthermore, the transceiver arrangement of this implementation form can be installed easily, as no additional connectors are necessary for the loopback path.

According to a second implementation form, the invention relates to a transceiver arrangement, wherein the waveguide comprises a rectangular cross-section. For example, the waveguide is a hollow conductor having the rectangular cross-section. A rectangular cross-section of the waveguide can, according to some implementation form, be produced easily and with little effort, in particular if the waveguide is at least partly integrated with the circuit board.

According to a third implementation form, the invention relates to a transceiver arrangement, wherein the waveguide is a hollow waveguide having walls and wherein an outer layer, in particular a ground plane, of the circuit board forms one of the walls of the waveguide. Hence, a production effort for the waveguide of this implementation form is further reduced, as an existing layer of the circuit board, for example the ground plane, is used to form part of the waveguide in close proximity to the circuit board.

According to a fourth implementation form, the invention relates to a transceiver arrangement, wherein an outer layer, in particular a ground plane, of the circuit board is connected to a reference potential terminal. Hence, the outer layer, which may be connected to a ground potential terminal, may act as a shield for the circuit board. For example, if the outer layer forms one of the walls of the waveguide, that wall may have a defined potential.

According to a fifth implementation form, the invention relates to a transceiver arrangement further comprising a constructive housing which comprises conducting material, wherein the waveguide is formed in the conductive housing. Hence, the circuit board can be in contact with the conductive housing. Furthermore, the geometric structure of the waveguide can, at least partially, be formed within the housing, thus reducing the production effort of this implementation form.

According to a sixth implementation form, the invention relates to a transceiver arrangement further comprising a constructive housing which comprises conducting material, wherein the waveguide is formed by the conductive housing. Hence, similar to the fifth implementation form, the circuit board can be in contact with the conductive housing. Furthermore, the geometric structure of the waveguide can, at least partially, be formed within the housing, thus reducing the production effort of this implementation form.

According to a seventh implementation form, the invention relates to a transceiver arrangement, further comprising a constructive housing being arranged adjacent to, in particular in contact with, the circuit board. For example, the waveguide is formed in or by the housing, such that the waveguide of this implementation form can be prefabricated with the housing and be attached to the circuit board for forming a connection between the circuit board and the waveguide for the loopback path.

According to an eighth implementation form, the invention relates to a transceiver arrangement, wherein the loopback path comprises a driver circuit coupling the Transceiver TX output to a first end of the waveguide. For example, the driver circuit comprises a switchable amplifier. Hence, a portion of the signal at the Transceiver TX output is sent to the driver circuit which amplifies the respective signal before launching it to the waveguide of the loopback path. The driver circuit supports the signal propagating through the waveguide, for example, if the signal power is too low. A second end of the waveguide may be coupled to the Transceiver RX input. The loopback function of the loopback path can be switched on or off, if a switchable amplifier is employed.

According to a ninth implementation form, the invention relates to a transceiver arrangement, wherein the Transceiver TX output comprises a first transition unit which is configured to launch a radio frequency signal from the TX path into a TX waveguide, e.g. a TX duplexer waveguide, and to launch the radio frequency signal from the TX waveguide into the loopback path. For example, the TX path comprises a signal path which is based on microstrip line technique on the circuit board, whereas a connection to an antenna duplexer TX port is formed by the TX duplexer waveguide. Hence, the first transition unit serves to launch a TX radio frequency signal to the TX waveguide. Furthermore, at least a portion of the TX radio frequency signal should be launched to the loopback path. The loopback path may comprise a portion of a microstrip line connected to the first transition unit.

According to a tenth implementation form, the invention relates to a transceiver arrangement, wherein the Transceiver RX input comprises a second transition unit which is configured to launch a radio frequency signal from an RX waveguide, e.g. an RX duplexer waveguide, into the RX path and to launch the radio frequency signal from the loopback path into the RX waveguide. Similar to the ninth implementation form, the second transition unit serves to launch an RX radio frequency signal from an RX waveguide coupled to an antenna duplexer into the RX path. Furthermore, a loopback signal received from the loopback path can be launched into the RX path by means of the second transition unit. Also in this implementation form, the second transition unit can comprise at least one microstrip line adapted for launching the respective radio frequency signal.

According to an eleventh implementation form, the invention relates to a transceiver arrangement, wherein the loopback path comprises a third transition unit which is configured to launch a radio frequency signal from a microstrip line which is coupled to the Transceiver TX output into the waveguide of the loopback path, and a fourth Transition unit which is configured to launch the radio frequency signal from the waveguide of the loopback path into a microstrip line which is coupled to the Transceiver RX input. For example, the loopback path comprises microstrip lines at its beginning and at its end, namely at its coupling to the Transceiver TX output and its coupling to the Transceiver RX input. The loopback path may further comprise several circuit elements like attenuators or a driver circuit which are coupled to the third and the fourth transition unit by means of microstrip lines.

The third and the fourth transition unit may be arranged on a first side of the circuit board and the waveguide may be arranged on a second side of the circuit board. In this case, the circuit board comprises respective waveguide transitions from the first side to the second side of the circuit board. Hence, it is possible to arrange the TX path and the RX path on a top side of the circuit board, whereas the waveguide is arranged at a bottom side of the circuit board. Thus in this implementation form, the waveguide of the loopback path does not interfere with any circuit parts arranged on the first side or top side of the circuit board.

BRIEF DESCRIPTION OF THE DRAWINGS

Further embodiments of the invention will be described with reference to the following figures, in which.

DETAILED DESCRIPTION OF ILLUSTRATIVE EMBODIMENTS

Figure 1:
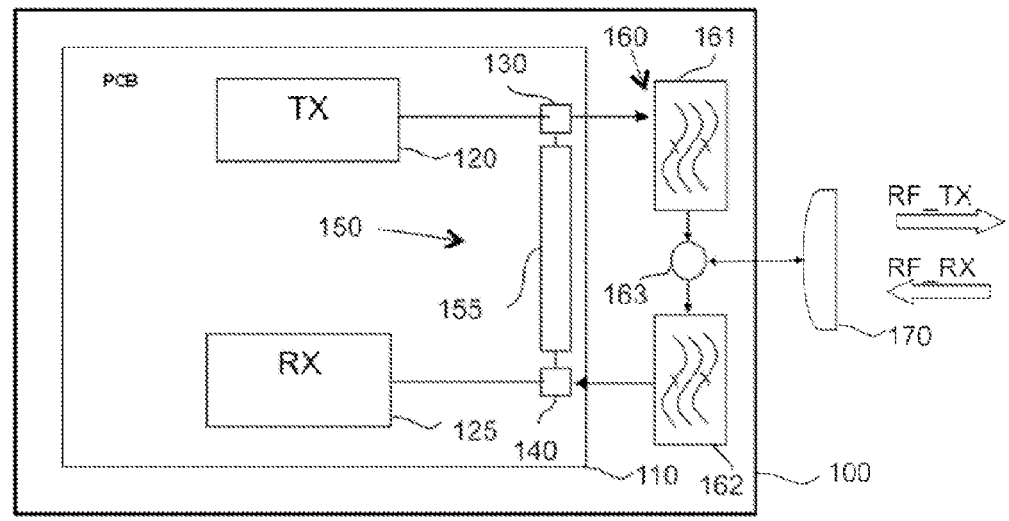
FIG. 1 shows a transceiver arrangement according to an implementation form.

FIG. 1 shows an embodiment of a transceiver arrangement with an outdoor unit 100 comprising a circuit board 110. The circuit board 110 comprises a transmit (TX) path 120 and a receive (RX) path 125. For example, the circuit board 110 is a printed circuit board (PCB). An output of the TX path 120 is coupled to a Transceiver TX output 130. Accordingly, an input of the RX path 125 is coupled to a Transceiver RX input 140. The Transceiver TX output 130 is coupled to the Transceiver RX input 140 by means of a loopback path 150 which comprises a waveguide 155. Transceiver TX output 130 and Transceiver RX input 140 are coupled to an antenna duplexer 160 which comprises bandpass filter elements 161, 162 and a duplexer element 163. The duplexer element 163 is further coupled to an antenna 170 which is adapted to transmit a radio frequency signal RF_TX and to receive a radio frequency signal RF_RX. For example, the Transceiver TX output 130 is connected to the antenna duplexer TX port for transmitting radio frequency signals and the Transceiver RX input 140 is connected to the antenna duplexer RX port for receiving radio frequency signals. In this case, Transceiver TX output 130 and Transceiver RX input 140 form antenna input and antenna output of the transceiver arrangement, respectively.

During the normal operation of the transceiver arrangement, the TX radio frequency signal RF_TX is generated and fed to the antenna duplexer 160 by means of the Transceiver TX output 130. For example, the antenna duplexer 160 is coupled to the Transceiver TX output 130 by means of a microstrip line to waveguide transition and a TX duplexer waveguide, by way of example. In the antenna duplexer 160, the signal RF_TX is filtered by the bandpass filter 161 and forwarded to the antenna 170 by means of the duplexer element 163 which prevents propagating of the signal RF_TX to the RX side and the RX path 125. Furthermore, during normal operation, the signal RF_RX is received by means of the antenna 170 and fed to the duplexer element 163 which guides the signal RF_RX to the RX side, in particular to the bandpass filter 162. Consequently, the propagating of the received signal RF_RX to the TX side is prevented by the duplexer element 163. After filtering, the filtered signal RF_RX is forwarded to the Transceiver RX input 140, for example by means of an RX duplexer waveguide and a waveguide to microstrip line transition, by way of example. From there, the signal is fed to the RX path 125 and further processed. Usually, a frequency of the TX radio frequency signal RF_TX and the RX radio frequency signal RF_RX are different.

In a test mode of operation, the TX path 120 and the RX path 125 are set to have the same frequency. The radio frequency signal generated by the TX path 120 is fed back to the RX path 125 by means of the loopback path 150 comprising the waveguide 155. Accordingly, a function of the TX path 120 and the RX path 125 can be tested without being influenced by operation of the antenna duplexer 160 and/or the antenna 170. Using the waveguide 155 in the loopback path 150 minimizes a signal loss from the Transceiver TX output 130 to the Transceiver RX input 140. Furthermore, the waveguide 155 is insensitive to interference or cross-talk with other signals present on the circuit board 110. For example, the waveguide 155 is at least partially integrated with the circuit board 110.

Figure 2:
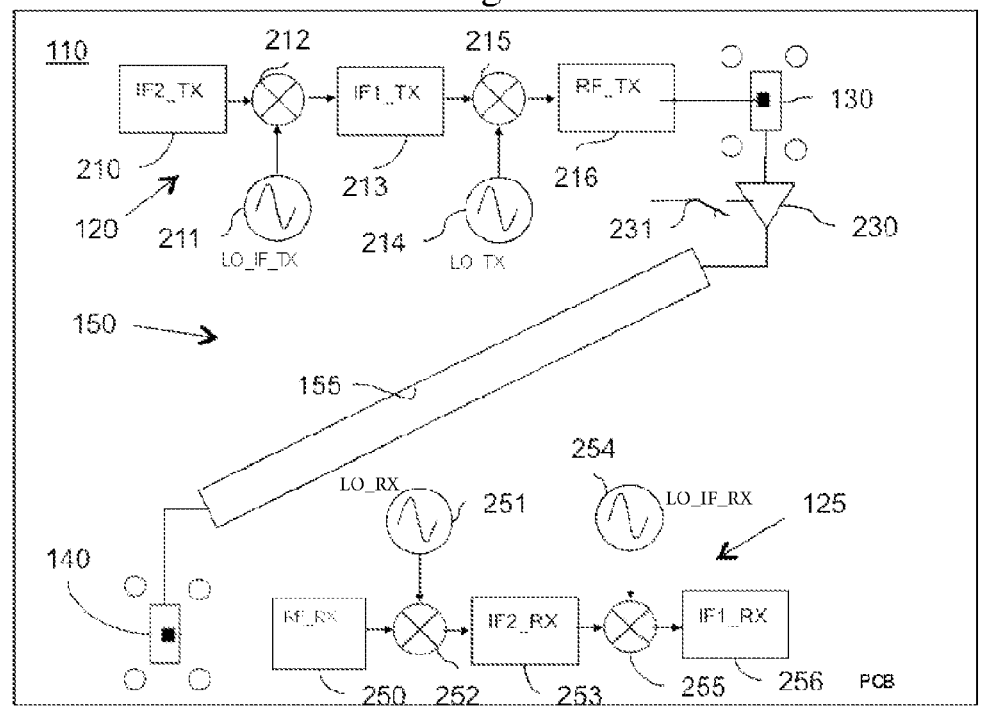
FIG. 2 shows a circuit board of a transceiver arrangement according to an implementation form.

FIG. 2 shows an implementation form of a circuit board 110 with a TX path 120, an RX path 125 and a loopback path 150. The TX path 120 comprises a first signal processing block 210 for processing a TX intermediate frequency signal IF2_TX. A signal generator 211 generates a local oscillator signal for the intermediate frequency LO_IF_TX which is provided to a mixer 212 together with the signal IF2_TX. The resulting signal is further processed in a second signal processing block 213, resulting in a second TX intermediate frequency signal IF1_TX. A second signal generator 214 generates a local oscillator radio frequency signal LO_TX which is provided to a second mixer 215 together with the signal IF1_TX. The resulting signal is processed in a third signal processing block 216 and provided to the Transceiver TX output 130 as the TX radio frequency signal RF_TX. For example, signal processing block 216 is a power amplifier.

During normal operation, the TX radio frequency signal RF_TX is provided to the antenna duplexer via a TX waveguide and, for example, a transition implemented in the Transceiver TX output 130. In the test mode of operation, a portion of the signal RF_TX is launched to the feedback path 150. In the feedback path 150, a driver circuit 230 which for example comprises an amplifier being switchable (231) on or off amplifies the signal portion launched into the loopback path 150. The amplified signal is then launched into the waveguide 155 which on a first end is connected to the driver circuit 230 and on a second end is connected to the Transceiver RX input 140. The waveguide 155 of the loopback path 150 crosses the circuit board 110 from a TX side, where the TX path 120 is located, to an RX side, where the RX path 125 is located.

During normal operation, an RX radio frequency signal RF_RX is received at the Transceiver RX input 140 via an RX waveguide and, for example, a waveguide to microstrip line Transition from the antenna duplexer 160. The antenna duplexer 160 and RX waveguide are not shown here for reasons of a better overview. During the test mode of operation, the signal propagated from the driver circuit 230 through the waveguide 155 is launched into the RX path 125. In both cases, the respective RX radio frequency signal RF_RX is provided to a fourth signal processing block 250 which may comprise a low-noise amplifier. A third signal generator 251 generates an RX local oscillator signal LO_RX which is provided to a third mixer 252 together with the RX radio frequency signal RF_RX. The resulting signal IF2_RX is processed in a fifth signal processing block 253. A fourth signal generator 254 generates an intermediate local oscillator frequency LO_IF_RX which is provided to a fourth mixer 255 together with the signal IF2_RX. The down-mixed resulting signal is provided to a sixth signal processing block 256 as an RX intermediate frequency signal IF1_RX.

The implementation of the loopback path 150 with the waveguide 155 improves the efficiency of the loopback path, in particular for higher frequencies in the range from about 23 GHz to 55 GHz. In such a frequency range, the use of a microstrip line crossing the circuit board 110 from the TX side to the RX side would be sensitive to interference with other signals on the circuit board and to insertion loss due to the high frequency.

Figure 3:
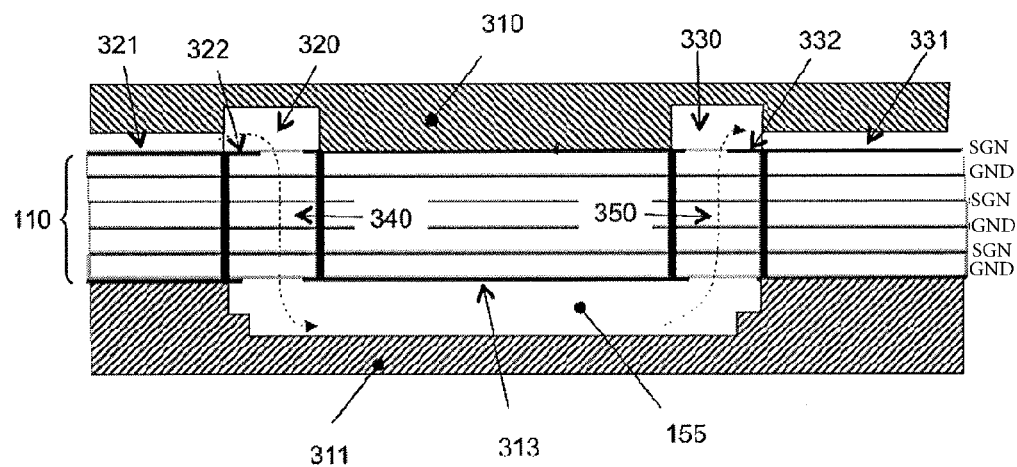
FIG. 3 shows a circuit board of a transceiver arrangement according to an implementation form.

FIG. 3 shows an implementation form of a circuit board 110 with a constructive housing 310, 311. The circuit board 110 in this implementation is a multi-layer printed circuit board, each layer connected to a signal terminal SGN or a reference potential terminal GND. The signal terminals SGN may have different potentials and may be associated with different signals. The constructive housing comprises a cover 310 which is made of a conductive material, for example comprising aluminum. Similarly, a bottom cover 311 of the constructive housing is made of a conductive material which preferably is the same as the material of the top cover 310. The bottom cover 311 comprises an elongated notch, wherein only a cross-section of the notch is depicted in FIG. 3. The notch in the bottom cover 311 forms three walls of the rectangular waveguide 155. A fourth wall of the waveguide 155 is formed by a conductive ground plane 313 of the outer bottom layer of the circuit board 110. The ground plane 313 is connected to the ground potential terminal GND.

The top cover 310 comprises a transition unit 320 which is also formed by a notch within the conductive material. The transition unit 320 comprises a microstrip line 321 whose end portion 322 protrudes into the rectangular notch. In a similar construction, the top cover 310 further comprises another transition unit 330 formed by a notch in the top cover 310. The transition unit 330 also comprises a microstrip line 331 with an end portion 332 protruding into the notch. By means of the end portions 322, 332 of the microstrip lines 321, 331, a signal on these microstrip lines 321, 331 is launched into and out from the waveguide 155, respectively. As the transition units 320 and 330 are arranged on the top side of the circuit board 110 and the waveguide 155 is arranged at the bottom side of the circuit board 110, respective waveguide transitions 340, 350 are provided for guiding the electromagnetic waves from the top side to the bottom side and vice versa. The walls of the waveguide transitions 340, 350 are made with grounded vias and, for example, connected to the ground potential terminal GND.

As circuit elements of the transceiver arrangement may be arranged on the top side of the circuit board 110, the waveguide 155 may not interfere with a position of such circuit elements. Furthermore, the notches in the top cover 310 and the bottom cover 311 of the constructive housing can be pre-fabricated and be brought in contact with the circuit board 110 in one of the final production steps of the transceiver arrangement.

Figure 4:
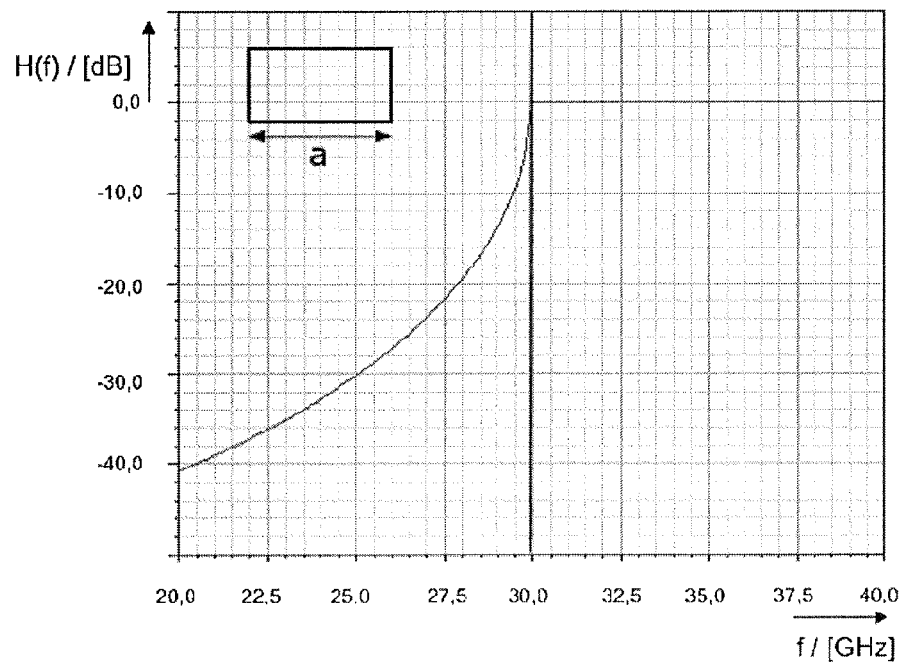
FIG. 4 shows a transfer function of a waveguide according to an implementation form.

The geometric dimensions of a waveguide determine its frequency response or transfer function respectively. FIG. 4 shows an exemplary transfer function of a rectangular waveguide with a width of 5 mm. It can be seen from the diagram that the frequency response corresponds to a highpass filter having a corner frequency of 30 GHz. Accordingly, a waveguide having these dimensions is not sensitive to frequencies lower than the corner frequency. Hence, lower frequency signals will not be coupled into the waveguide 155 from neighboring signal lines.

Figure 5:
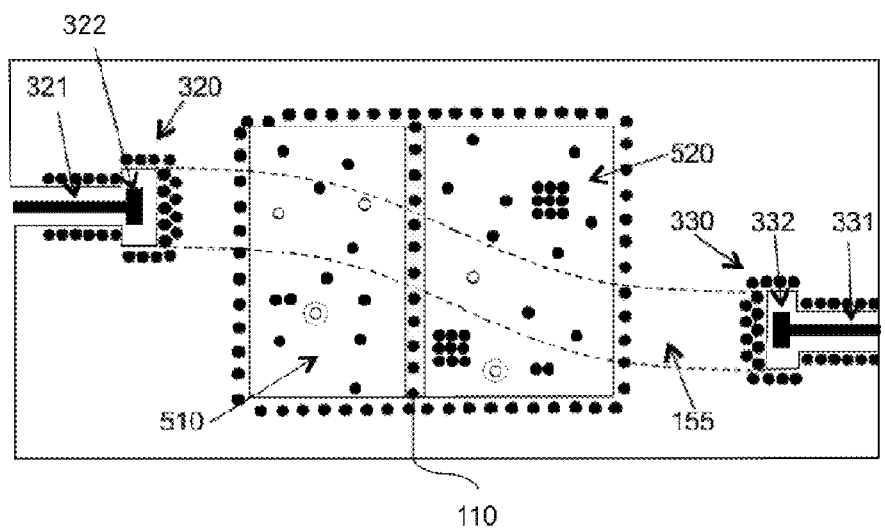
FIG. 5 shows a circuit board of a transceiver arrangement according to an implementation form.

This can, for example, be desirable, if the way of the waveguide 155 across the circuit board 110 crosses signal lines or vias. By way of example, FIG. 5 shows a top view on an implementation of a circuit board 110 wherein a way of the waveguide 155 crosses two circuit areas 510, 520 on the bottom side of the circuit board 110. In the drawing of FIG. 5, the black circles denote ground vias which in general are uncritical for interference. The white circles denote signal vias carrying various signals. However, due to the nature of the waveguide 155, in particular its high-pass frequency response, signals transported in the signal vias are uncritical for the signal transported in the waveguide 155 and vice versa.

Figure 6:
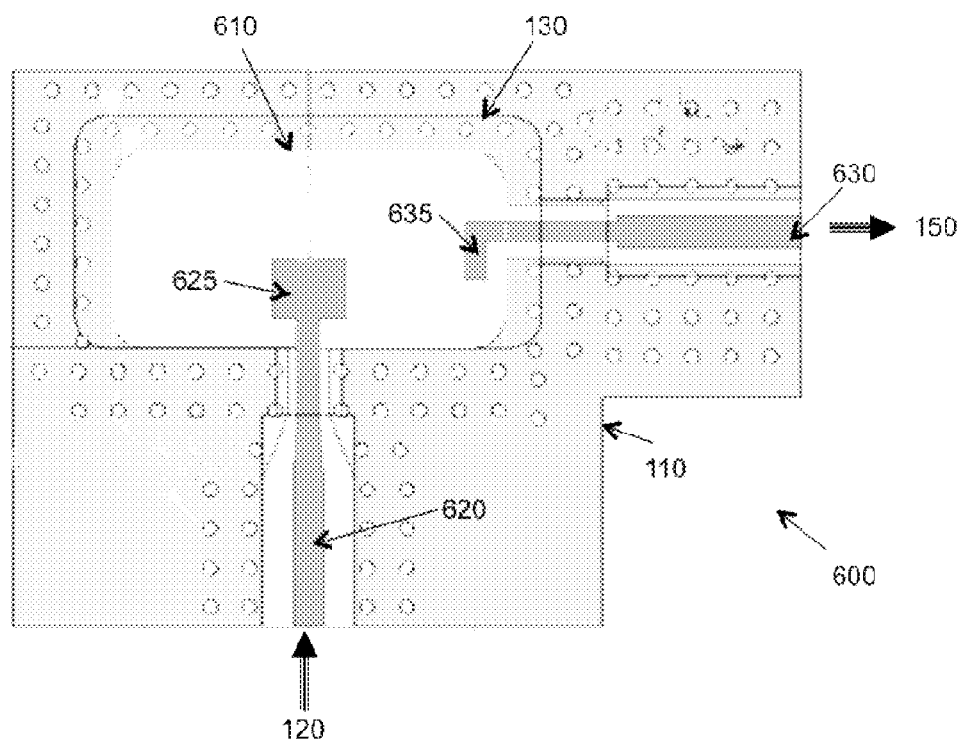
FIG. 6 shows a transition unit of a transceiver arrangement according to an implementation form.

FIG. 6 shows an implementation form of the Transceiver TX output 130. It should be noted that a similar construction can also be used for the Transceiver RX input 140. The Transceiver TX output 130 comprises a transition unit 600 formed within the circuit board 110. By means of the transition unit 600, a TX radio frequency signal from the TX path 120 is launched to a TX waveguide 610. To this end, the transition unit 600 comprises a microstrip 620 which for example is connected to the signal processing block 216 of FIG. 2. An end portion 625 of the microstrip line 620 protrudes into the TX waveguide 610 for launching the radio frequency signal into the TX waveguide 610. The transition unit 600 further comprises a microstrip 630 connected to the loopback path 550 and having an end portion 635 also protruding into the TX waveguide 610. During operation, the end portion 625 of the microstrip line 620 launches an electromagnetic wave into the TX waveguide 610 which propagates to the antenna duplexer, for example. Additionally, by means of the end portion 635 of the microstrip line 630, a portion of the radio frequency signal or electromagnetic wave respectively is launched into a loopback path 150. Hence, a single launching area for both the TX path 120 and the loopback path 150, namely the transition unit 600 is sufficient.

Figure 7:
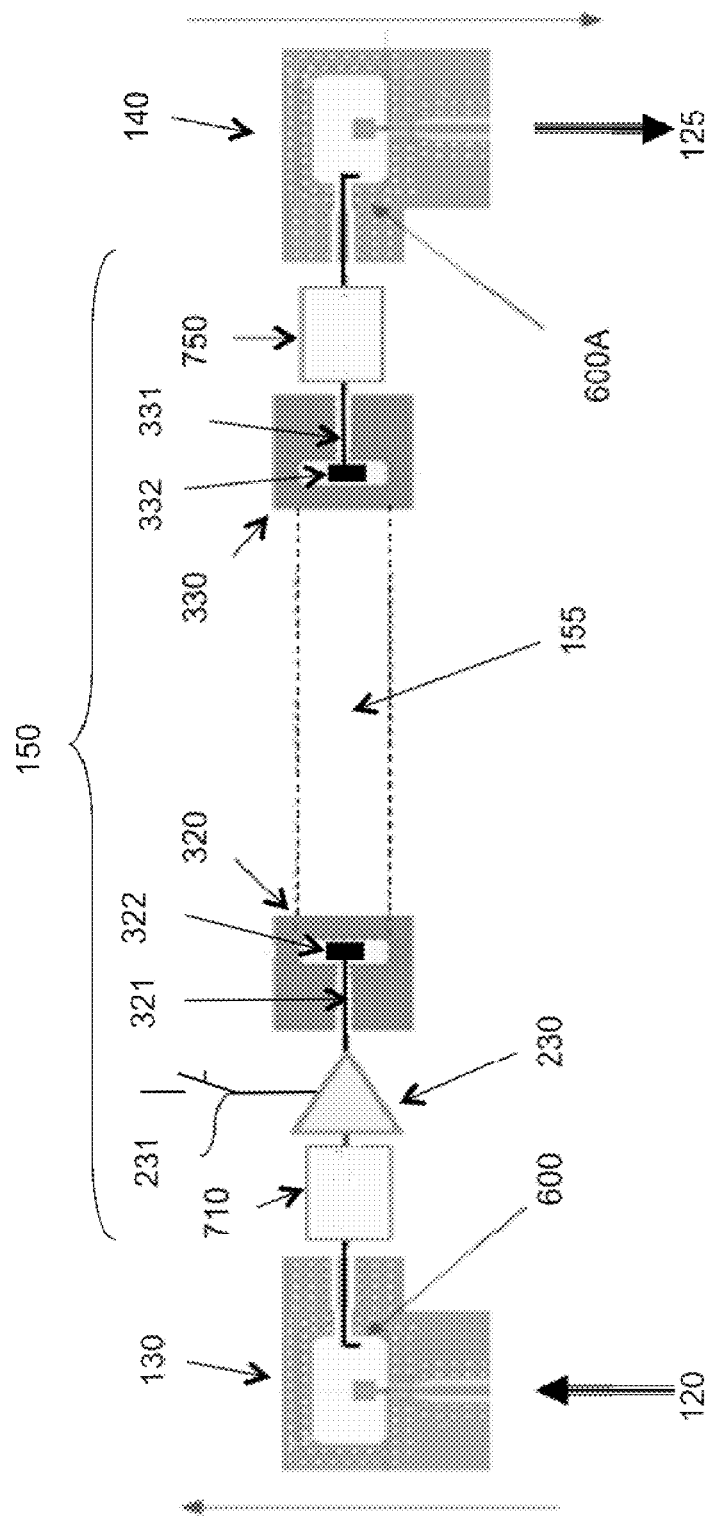
FIG. 7 shows a loopback path of a transceiver arrangement according to an implementation form.

FIG. 7 shows an implementation of the loopback path 150 from the Transceiver TX output 130 to the Transceiver RX input 140. At the transceiver TX output 130, the loopback radio frequency signal is launched by means of the transition unit 600. In particular, the transition unit 600 is coupled to an attenuation element 710 of the loopback path 150, the attenuation element is 710 being coupled to the driver circuit 230. An output of the driver circuit 230 is coupled to the transition unit 320 by means of the microstrip line 321. The driver circuit 230 and the transition unit 320 are preferably located close to each other on the circuit board 110. The transition unit 320 is connected to the transition unit 330 by means of the waveguide 155. The microstrip line 331 of the transition unit 330 is connected to a second attenuation element 750 whose output is connected to a further transition unit 600A of Transceiver RX input 140. The construction of the transition element 600A may be the same as of the transition unit 600.

Using the waveguide 155 in the loopback path 150, it is found that the insertion loss of the waveguide 155 is negligible also at high frequencies in the Gigahertz range, and a length of the waveguide is not critical, in particular compared to the microstrip line. If the waveguide of the loopback path 150 is arranged in a bottom housing of the transceiver arrangement in this implementation form, an integrated solution with the circuit board of the transceiver arrangement can be achieved, as the notch and the bottom housing can be considered like an additional layer. An isolation of the loopback path 150 from signals on the circuit board is increased by the use of the waveguide 155. Additionally, as the waveguide 155 of the loopback path 150 is not able to propagate a signal below its cut-off frequency, the coupling of a signal that may be intercepted from the circuit board is not significant. The coupling of the loopback path between the TX path and the RX path is integrated in the transition units 600, 600A which can also be called main launchers. In particular at the high frequency ranged mentioned above, this solution allows to save power between a power amplifier of the TX path and the antenna duplexer, resulting in a better performance for linear radio requirement and between the antenna duplexer and the low-noise amplifier of the RX path, resulting in a better receiver noise figure.

The attenuation elements 710 and 750 of this implementation form are provided for improving the matching of the impedance of the loopback path microstrip lines to the TX waveguide and the RX waveguide main Launchers, respectively.

According to some implementation forms, for high frequency applications a waveguide may be used in the loopback path, such waveguide being significantly better in insertion loss performances and acceptable in mechanical dimensions. Instead to use a more expensive solution implemented in an antenna duplexer, according to some implementation forms a waveguide is used as an additional layer of a circuit board, in particular a printed circuit board PCB, done in a bottom cover of the arrangement. The upper wall of the waveguide is the PCB GND bottom layer in this implementation.

The transition from a top layer microstrip to the loop back waveguide is implemented with an additional launcher, properly sized to save space and to have a good matched transition for high frequency. Loopback coupling to the TX and RX paths is integrated in the main launcher to the antenna duplexer in order to increase performance for TX $OIP_3$ (Output Third Order Intercept Point) and RX NF (Noise Figure).

What is claimed is:

1. A transceiver arrangement, comprising:
    a circuit board with a transmit path and a receive path;
    a transceiver transmit output coupled with the transmit path;
    a transceiver receive input coupled with the receive path; and
    a loopback path coupling the transceiver transmit output and the transceiver receive input, wherein the loopback path comprises:
        a first transition unit which is configured to launch a radio frequency signal from a first microstrip line which is coupled to the transceiver transmit output into a hollow waveguide of the loopback path; and
        a second transition unit which is configured to launch the radio frequency signal from the hollow waveguide of the loopback path into a second microstrip line which is coupled to the transceiver receive input;

wherein the first transition unit and the second transition unit are arranged on a first side of the circuit board;

wherein the hollow waveguide is arranged on a second side of the circuit board; and wherein the first transition unit and the second transition unit are configured to guide the radio frequency signal from the first side of the circuit board to the second side of the circuit board through a nonconductive medium.

2. The transceiver arrangement of claim 1, wherein the hollow waveguide is at least partly integrated with the circuit board.

3. The transceiver arrangement of claim 1, wherein the hollow waveguide comprises a rectangular cross-section.

4. The transceiver arrangement of claim 1, wherein the hollow waveguide comprises walls and wherein a ground plane of the circuit board forms one of the walls of the hollow waveguide.

5. The transceiver arrangement of claim 1, wherein an outer layer of the circuit board comprises a ground plane that is connected to a reference potential terminal (GND).

6. The transceiver arrangement of claim 1, further comprising a constructive housing which comprises conducting material, wherein the hollow waveguide is formed in or by the conductive housing.

7. The transceiver arrangement of claim 1, further comprising a constructive housing being arranged adjacent to the circuit board.

8. The transceiver arrangement of claim 1, wherein the loopback path comprises a driver circuit coupling the transceiver transmit output to a first end of the hollow waveguide.

9. The transceiver arrangement of claim 8, wherein the driver circuit comprises a switchable amplifier.

10. The transceiver arrangement of claim 1, wherein the transceiver transmit output comprises a third transition unit which is configured to launch a radio frequency signal from the transmit path into a transmit waveguide and to launch the radio frequency signal from the transmit waveguide into the loopback path.

11. The transceiver arrangement of claim 10, wherein the third transition unit comprises a microstrip line adapted for launching the respective radio frequency signals.

12. The transceiver arrangement of claim 1, wherein the transceiver receive input comprises a fourth transition unit which is configured to launch a radio frequency signal from a receive waveguide into the receive path and to launch the radio frequency signal from the loopback path into the receive waveguide.

13. The transceiver arrangement of claim 1, wherein the circuit board is a multi-layer printed circuit board.

14. The transceiver arrangement of claim 4, wherein an outer layer of the circuit board comprises a ground plane.

15. The transceiver arrangement of claim 7, wherein the constructive housing is in contact with the circuit board.

16. A method, comprising:

generating a transmit signal by a circuit board, the circuit board comprising a transmit path and a receive path;

receiving the transmit signal by a transceiver, a transmit output of the transceiver coupled with the transmit path and a receive input of the transceiver coupled with the receive path; and routing the transmit signal along a loopback path coupling the transceiver transmit output and the transceiver receive input, the loopback path comprising a hollow waveguide;

wherein the transceiver transmit output comprises a first transition unit which is configured to launch the transmit signal from the transceiver transmit output into the loopback path; and wherein the first transition unit comprises a sidewall extending from a top surface of the circuit board to a bottom surface of the circuit board, the sidewall comprising a plurality of grounded vias and extending along at least three sides of a hollow cavity, the sidewall forming a path along which the transmit signal travels from the transceiver transmit output into the loopback path.

17. The method of claim 16, wherein the hollow waveguide is at least partly integrated with the circuit board.

18. The method of claim 16, wherein the hollow waveguide comprises a rectangular cross-section.

19. The transceiver arrangement according to claim 1, further comprising:

a conductive housing, a top housing of the conductive housing overlying the circuit board and a bottom housing of the conductive housing underlying the circuit board;

wherein the hollow waveguide is partly integrated with the circuit board;

wherein the bottom housing comprises an elongated notch in a top surface of the bottom housing, the elongated notch forming three walls of the hollow waveguide; and wherein a bottom surface of the circuit board forms a fourth wall of the hollow waveguide, the bottom surface of the circuit board being a conductive layer that is connected to ground.

20. The transceiver arrangement according to claim 1, wherein the transceiver transmit output comprises a third transition unit which is configured to launch the radio frequency signal from the transceiver transmit output into the loopback path; and wherein the third transition unit comprises a sidewall extending from a top surface of the circuit board to a bottom surface of the circuit board, the sidewall comprising a plurality of grounded vias and extending along at least three sides of a hollow cavity, the sidewall forming a path along which the radio frequency signal travels from the transceiver transmit output into the loopback path.

* * * * *

UNITED STATES PATENT AND TRADEMARK OFFICE
CERTIFICATE OF CORRECTION

PATENT NO. : 9,525,450 B2  
APPLICATION NO. : 14/293847  
DATED : December 20, 2016  
INVENTOR(S) : Mario Costa Page 1 of 1

It is certified that error appears in the above-identified patent and that said Letters Patent is hereby corrected as shown below:

In the Claims

In Column 9, Line 44, Claim 11, delete "respective".

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*